US009626628B2

(12) United States Patent
Dasgupta et al.

(10) Patent No.: US 9,626,628 B2
(45) Date of Patent: Apr. 18, 2017

(54) POINT-TO-MULTIPOINT COMMUNICATION INFRASTRUCTURE FOR EXPERT-BASED KNOWLEDGE FEED-BACK USING LEARNING MACHINES

(71) Applicant: Cisco Technology, Inc., San Jose, CA (US)

(72) Inventors: Sukrit Dasgupta, Norwood, MA (US); Jean-Philippe Vasseur, Saint Martin d'Uriage (FR); Grégory Mermoud, Veyras (CH)

(73) Assignee: Cisco Technology, Inc., San Jose, CA (US)

( * ) Notice: Subject to any disclaimer, the term of this patent is extended or adjusted under 35 U.S.C. 154(b) by 397 days.

(21) Appl. No.: 14/165,462

(22) Filed: Jan. 27, 2014

(65) Prior Publication Data
US 2015/0186799 A1 Jul. 2, 2015

Related U.S. Application Data

(60) Provisional application No. 61/922,305, filed on Dec. 31, 2013.

(51) Int. Cl.
*G06N 99/00* (2010.01)
(52) U.S. Cl.
CPC .................... *G06N 99/005* (2013.01)
(58) Field of Classification Search
None
See application file for complete search history.

(56) References Cited

U.S. PATENT DOCUMENTS

| 7,233,934 | B1 | 6/2007 | Oggerino et al. | |
|---|---|---|---|---|
| 8,275,736 | B2* | 9/2012 | Guo | G06Q 10/10 706/54 |
| 2001/0047270 | A1* | 11/2001 | Gusick | G06Q 30/016 705/1.1 |
| 2006/0036563 | A1* | 2/2006 | Wu | G06N 5/022 706/59 |
| 2007/0025277 | A1 | 2/2007 | Sajassi et al. | |
| 2007/0268838 | A1 | 11/2007 | Moon | |

(Continued)

OTHER PUBLICATIONS

Dasgupta, et al., "Point-to-Multipoint Communication Infrastructure for Expert-Based Knowledge Feed-Back Using Learning Machines", U.S. Appl. No. 61/922,305, filed Dec. 31, 2013, 36 pages, U.S. Patent and Trademark Office, Alexandria, VA.

(Continued)

*Primary Examiner* — Kakali Chaki
*Assistant Examiner* — Michael Zidanic
(74) *Attorney, Agent, or Firm* — Parker Ibrahim & Berg LLC; James M. Behmke; Stephen D. LeBarron (57) ABSTRACT

In one embodiment, techniques are shown and described relating to a point-to-multipoint communication infrastructure for expert-based knowledge feed-back using learning machines. A learning machine may communicate an expert discovery request into a network to discover one or more experts, and then receive from the one or more experts, one or more expert discovery responses. Based on the one or more received expert discovery responses, the learning machine may then build a dynamic multicast tree of experts to assist the learning machine in a computer network.

18 Claims, 9 Drawing Sheets

(56) References Cited

U.S. PATENT DOCUMENTS

2009/0232031 A1    9/2009   Vasseur et al.
2013/0181827 A1*   7/2013   Zheng ................ G05B 13/0265
                                                                                   340/501
2014/0003229 A1    1/2014   Gandhi et al.

OTHER PUBLICATIONS

Winter, et al., "RPL: IPv6 Routing Protocol for Low-Power and Lossy Networks", Request for Comments 6550, Mar. 2012, 157 pages, Internet Engineering Task Force Trust.

\* cited by examiner

REGRESSION USING VBLS-RVM, THE CORRESPONDING CONFIDENCE INTERVAL IS DEPICTED USING THE SHADED AREA. ANY POINT BEYOND THIS SHADED AREA CAN BE CONSIDERED AN OUTLIER, AND WOULD THEREFORE REQUIRE A VALIDATION FROM AN EXPERT BEFORE BEING INCORPORATED INTO THE MODEL

POINT-TO-MULTIPOINT COMMUNICATION INFRASTRUCTURE FOR EXPERT-BASED KNOWLEDGE FEED-BACK USING LEARNING MACHINES

RELATED APPLICATIONS

This application claims priority to U.S. Provisional Application No. 61/922,305, filed Dec. 31, 2013, entitled: POINT-TO-MULTIPOINT COMMUNICATION INFRASTRUCTURE FOR EXPERT-BASED KNOWLEDGE FEED-BACK USING LEARNING MACHINES, by Dasgupta et al., the contents of which are herein incorporated by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and performance indicators), and recognize complex patterns in these data. In general, these patterns are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Learning Machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, techniques are shown and described relating to a point-to-multipoint communication infrastructure for expert-based knowledge feed-back using learning machines. A learning machine may communicate an expert discovery request into a network to discover one or more experts, and then receive from the one or more experts, one or more expert discovery responses. Based on the one or more received expert discovery responses, the learning machine may then build a dynamic multicast tree of experts to assist the learning machine in a computer network.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1:
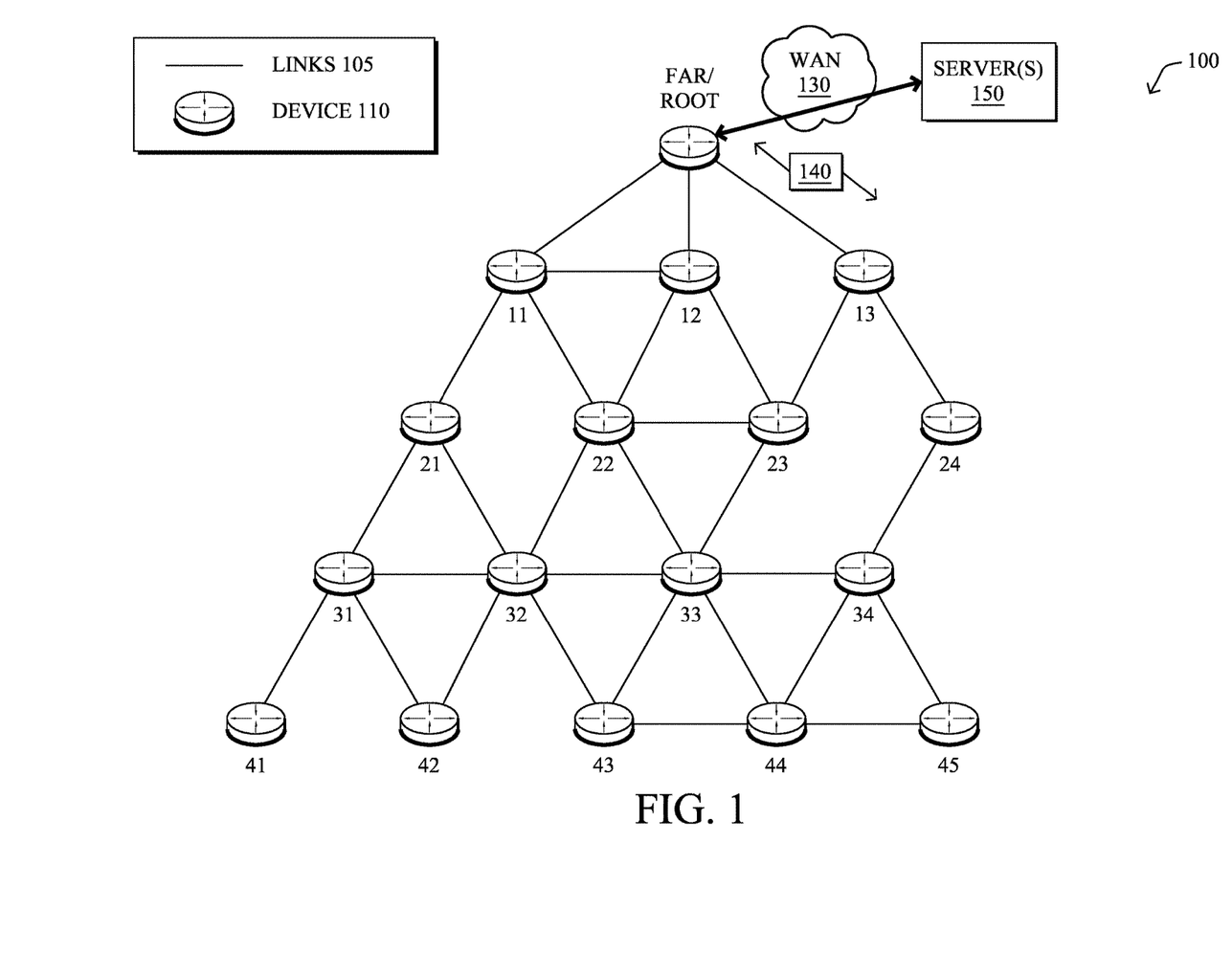
FIG. 1 illustrates an example communication network.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
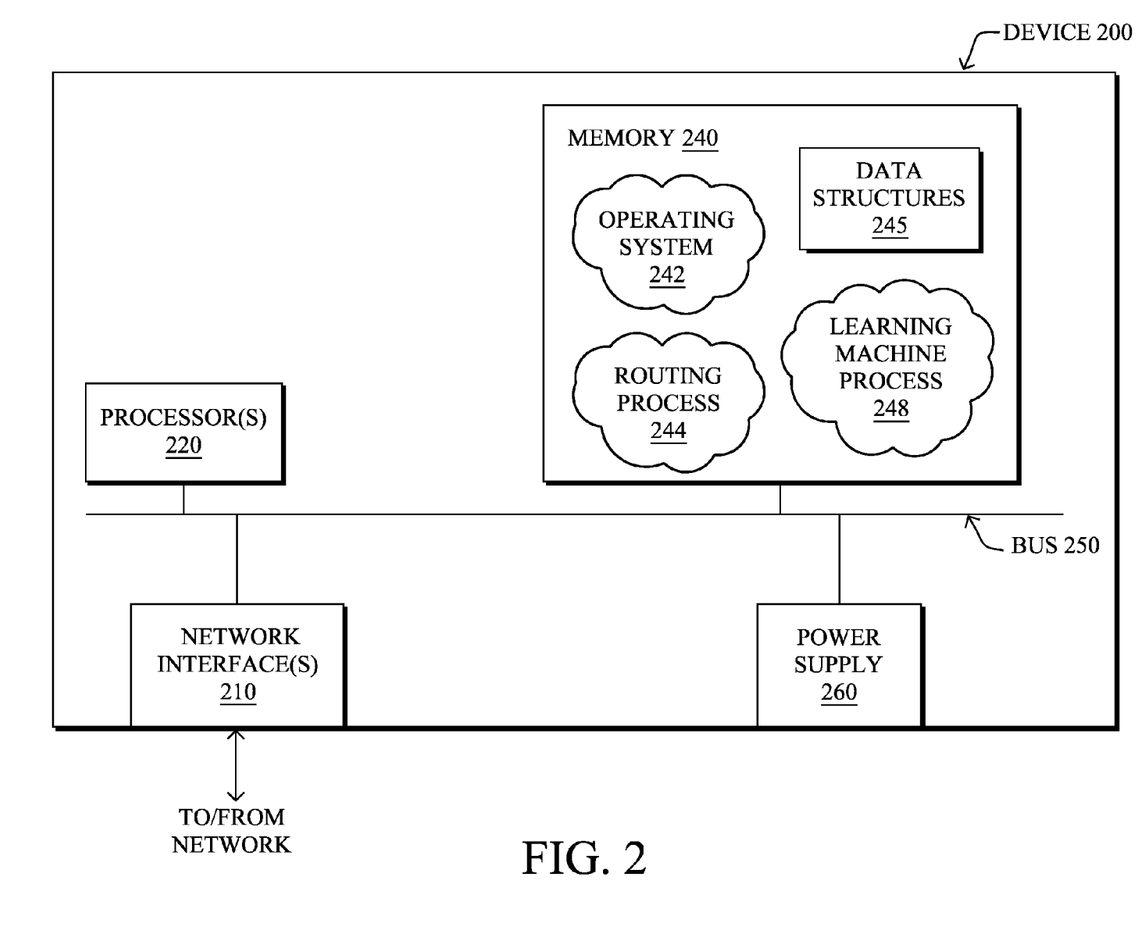
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
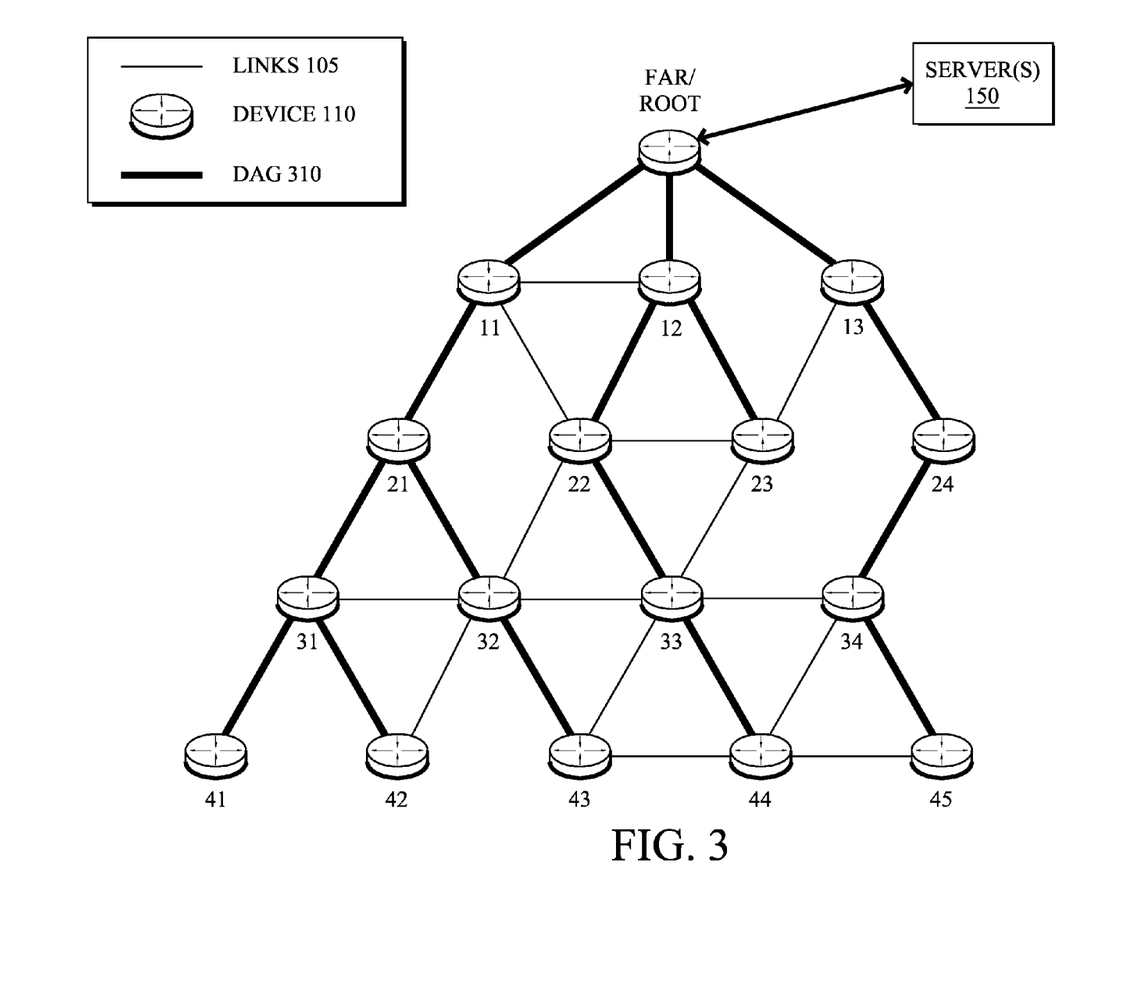
FIG. 3 illustrates an example directed acyclic graph (DAG) in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

Notably, RPL supports two modes of operation for maintaining and using downward routes:

1) Storing Mode: RPL routers unicast DAO messages directly to their DAG Parents. In turn, RPL routers maintain reachable IPv6 addresses for each of their DAG Children in their routing table. Because intermediate RPL routers store Downward routing state, this mode is called Storing mode.

2) Non-Storing Mode: RPL routers unicast DAO messages directly to the DAG Root. The DAO message also includes the IPv6 addresses for the source's DAG Parents. By receiving DAO messages from each RPL router in the network, the DAG Root obtains information about the DAG topology and can use source routing to deliver datagrams. Unlike Storing mode, intermediate RPL routers in Non-Storing mode do not maintain any Downward routes.

Learning Machine Technique(s)

As noted above, machine learning (ML) is concerned with the design and the development of algorithms that take as input empirical data (such as network statistics and performance indicators), and recognize complex patterns in these data. One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely on one or more ML algorithms for performing a task for which they have not been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

Generally, LM algorithms can be classified into three main categories: (i) unsupervised LMs, (ii) supervised LMs, and (iii) reinforcement learning. Unsupervised LMs can operate completely autonomously without human intervention: they generally tackle tasks such as clustering or dimensionality reduction, which consist in finding hidden structure or patterns in data. Supervised LMs require the input of an expert, generally in the form of labeled data. For the purposes of the present disclosure, an expert, or external expert, may also be referred to as a "user." For instance, when dealing with classification, the LM will first require training data with correct labels for adjusting (i.e., learning) what are the various relevant properties corresponding to each category. Once this step is completed, the LM can classify new input samples in an autonomous fashion. Reinforcement learning is a different type of LM, which lies in between supervised and unsupervised learning. In this case, the LM adjusts a policy so as to maximize the reward obtained by its actions. This reward may or may not be defined by an external expert.

When LMs are in use, the LM constantly monitors the state of the system and runs its algorithm for classification, clustering, etc. Several scenarios may arise where an LM algorithm might not know how to categorize a certain set of network data, e.g., state values, that it has observed or it might not know how good its performance is with respect to a given task. Such scenarios may occur during the initial enablement of an algorithm (e.g., the LM has not yet gathered a sufficient amount of information/knowledge to perform its tasks), occurrence of corner cases or sudden network events leading to unexpected behavior, or they may be an intrinsic requirement of the algorithm. In such a situation, an algorithm could incorrectly classify this event, leading to noise in its knowledge and/or further incorrectness, or, based on its prior knowledge, might not know how to react. It is possible to ask the system for more information using active methods such as pings and probes, however, this technique would not yield much information when the algorithm does not have much information about the state of the system.

A technique has been proposed to help the LM when using supervised or, in some cases, reinforcement learning, and aid the LM in inferring the state values being presented to it by the running system. In particular, this technique proposed a mechanism whereby an LM can create an on-the-fly tunnel/connection to a human entity for supervision when it encounters states that it has difficult in categorizing. Said differently, there are a number of circumstances where a LM may not be able to perform its task: the amount of accumulated information/knowledge is not sufficient, the level of confidence provided by the algorithm in use by the LM falls below some low-level threshold, a new type of network event is taking place, etc. These techniques thus dynamically establish a machine-to-human "dialogue" in order to temporarily assist the learning machine, e.g., in recognizing received network data and classifying different types of events. This will be done using an architecture where experts will be reachable according their level and area of expertise. Whenever the LM will encounter a situation needing expert input, it will create a channel to correspond with registered experts. As time progresses, the LM will also learn to pick experts intelligently and will do so by taking educated decisions based on the kind of state it observes. The last component consists in providing feed-back to the NMS on the quality of the human intervention for dynamic handling of future requests.

In one embodiment of these techniques, network data is received at a Learning Machine (LM) in a network. It is determined whether the LM recognizes the received network data based on information available to the LM. When the LM fails to recognize the received network data: a connection to a central management node, e.g., NMS, is established, a request is sent for information relating to the unrecognized network data to the central management node, and information is received from the central management node in response to the request. The received information assists the LM in recognizing the unrecognized network data.

A first component of these techniques consists of the registration phase. Here, the human entities notify the NMS of their presence and register with the NMS to receive queries from the LM for expert opinion. In this step, every human agent that registers, specifies details such as area of expertise, policies for when they should be contacted, criticality of events that should be notified and even billing information (note that supervised learning may be "sold" as a service or may be part of a managed service plan). At the same time, when new LMs are enabled, they register with the NMS and let the NMS know of their requirements. One such requirement can be the expert input of a human entity, which may or may not be satisfied according to policy. Once the NMS receives this requirement from the LM, it shares the details of the human agents so the LM can contact them. Once this registration phase is completed, all the entities know how to reach each other. The NMS has details of all the human agents and vice-versa. To that end, these techniques specify a newly defined IPv6 unicast message used for human entities to register to the NMS and for the NMS to provide the list of "helping" human agents subject to policy. Alternatively, extensions to a protocol such as DHCP may be used for that purpose.

A second component of these techniques involves the actual interaction of all the entities. While the LM is running, state values start to be gathered from the system it is tracking. These values continuously populate the LMs knowledge database. Several situations may arise:

1. The LM can be configured such that a configurable number of first values need to be classified manually using a human input. Essentially, the LM will rely on the human to recognize and create classes of values and then start to classify each incoming value into those classes. After that the LM will eventually take over and continue to classify new values. Such a mechanism is particularly useful when the algorithms don't have any initial state configured.

2. On many occasions, values will be obtained that are stark outliers, and the LM could either treat them as regular data points that will skew the knowledge or it could get expert opinion from a human. In the latter case, the LM may establish a tunnel to the NMS and send relevant information to it. This information could include existing states, the value of the outliers, the classes being used to classify values, etc.

Figure 4:
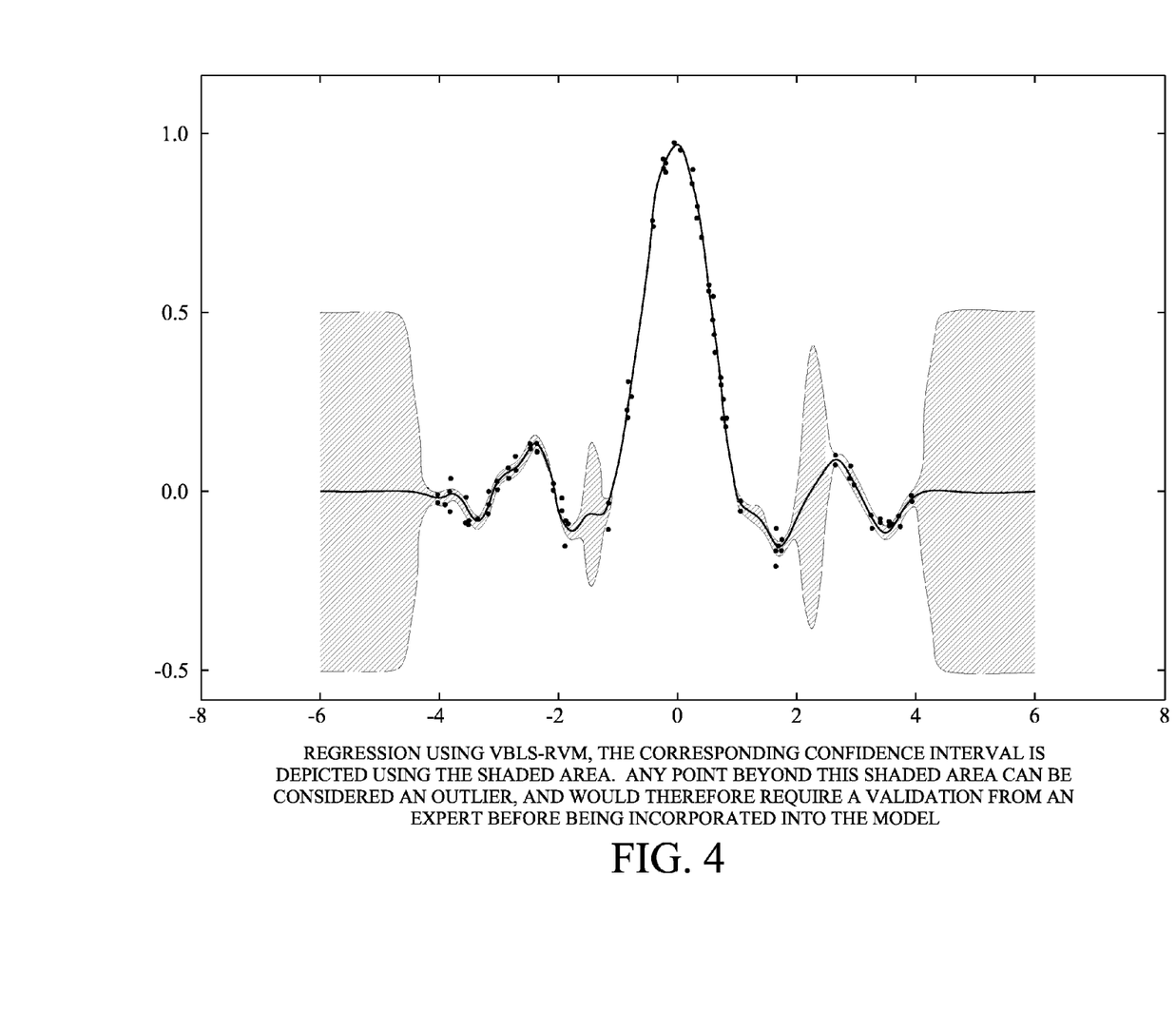
FIG. 4 illustrates an example regression graph.

For instance, in the context of U.S. Provisional Patent Application Ser. No. 61/761,117, entitled "Learning Machine Based Detection of Abnormal Network Performance", filed by Vasseur et al. on Feb. 5, 2013, an algorithm is used called Variational Bayesian Least Squares (VBLS) for estimating the QoS of nodes as a function of their properties (e.g., hop count, ETX, number of children, traffic, etc.). Importantly, VBLS provides an interval of confidence on the estimate $Q_i$ of the QoS of node (see FIG. 4), that is, an interval $[Q_{i,x\%}, Q_{i,(100-x)\%}]$ that captures the expected extrema of nodes, outlier detection can be easily achieved by verifying that any newly measured QoS value $Q_i$ is indeed within this interval.

Upon receiving the request from the LM (e.g., using the newly defined message specified above), the expert can take several actions:

1. Upon being presented with the classes and current state of the system, the expert can classify the value as a new class of state (such as congestion, failure, security attack, etc.) or as an existing class of state.

2. Alternatively, the expert can ask for more details from the LM. This could be a set of parameters that have been pre-decided to be available. Once this happens, the LM will supply the information requested and could keep continuing to do so until it runs out of any useful information to supply.

Once the LM receives the user input, it will make the following changes in its state:

1. It will start to learn which experts can be contacted for which kind of issues. Together with the policies that it will learn from the NMS, it can be selective with the experts and with the information for which it wants expert opinion.

2. It will start to take the input of the expert into its computations resulting in more accurate knowledge about the state of the network.

3. It will also learn the sequence of steps the expert undertook to reach the conclusion. For illustration, this sequence of steps could be the questions/request for information that the expert asked the LM.

A last component of these techniques consists in providing (optional) feed-back to the NMS on the effectiveness of the human interaction to the NMS. To that end a newly defined message is specified that is used by the LM to indicate for each request (or groups of requests) the nature of the issue for which assistance has been required and the number of times a reply has been provided by the human entities. This is useful from several aspects. Firstly, historical information may be maintained that can be referred to such that if similar things were to happen, there is a record of what set of actions and what kind of interpretation the expert undertook. Also, performance and contribution of the experts can be quantified on a regular basis.

Figure 5:
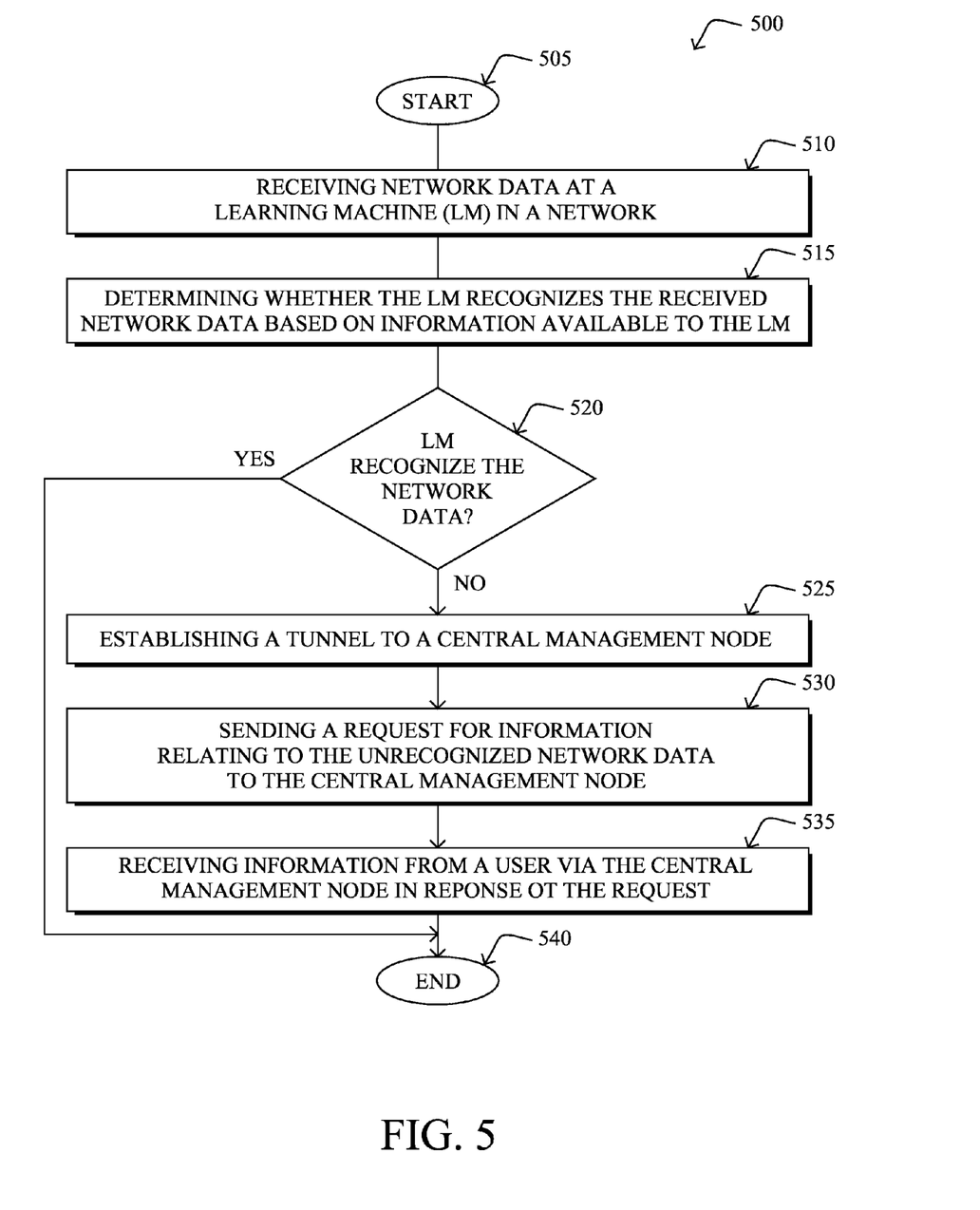
FIG. 5 illustrates an example simplified procedure for triggering on-the-fly requests for supervised learning of learning machines.

FIG. 5 illustrates an example simplified procedure for triggering on-the-fly requests for supervised learning of learning machines. As shown in FIG. 5, the procedure 500 may start at step 505, continue to step 510, and so forth, where, as described in greater detail above, a tunnel connection is established from the LM to a central management node, e.g., NMS, in order to receive additional data from a user, e.g., human expert.

At Step 510, the procedure 500 includes receiving network data at an LM in a network. At Step 515, it is determined whether the LM recognizes the received network data based on information available to the LM. When the LM recognizes the received network data, the procedure 500 continues to Step 540, where the procedure illustratively ends. However, when the LM fails to recognize the received network data (Step 520), the procedure 500 continues to Step 525, where a tunnel connection to a central management node is established. Then, at Step 530, a request for information relating to the unrecognized network data is sent to the central management node. At Step 535, information is received from a user via the central management node in response to the request. The received information assists the LM in recognizing the unrecognized network data. The procedure 500 illustratively ends at Step 540. The techniques by which the steps of procedure 500 are performed, as well as ancillary procedures and parameters, are described in detail above.

The techniques described above, therefore, provide for triggering on-the-fly requests for supervised learning of learning machines. In particular, these techniques allow for human expert input, which greatly increases the efficacy of the LM mechanism (wherein classifications are allowed to be more customizable). Also, outliers can sometimes be detected more easily by experts, than if a LM were to do on its own. As such, the framework relies on the expertise of humans that is gained over years of experience allowing them to discern small but significant variations. Lastly, initial states for ML algorithms such as VBLS, PCA, HMM, etc. may be obviated (or at least their impact reduced) and may instead be built up solely with the aid of human supervision during the initial stages.

Point-to-Multipoint Communications

As noted above, when learning machines (LMs) are in use, the LM constantly monitors the dynamics of the system, extracts data that are relevant to these dynamics, and feeds them to its internal algorithms for classification, clustering, etc. However, several scenarios may arise where the LM does not have a way of categorizing a certain set of state values that it has observed or it does not know how good its performance is with respect to a given task. For instance, when it comes to classification, the LM needs so-called labeled data during its training phase, that is, for any particular state of the system, it needs a corresponding label (e.g., normal, degraded performance, DDoS attack, etc.). Such scenarios may occur during the initial training of the algorithm (the LM has not yet gathered a sufficient amount of information/knowledge to perform its tasks), occurrence of corner cases or sudden network events leading to unexpected behavior, or they may be an intrinsic requirement of the algorithm. In such a situation, the LM may perform in a suboptimal way, thereby leading to poor network performance, further incorrectness, and, based on its prior knowledge, might not know how to react. The LM may trigger various actions such as active methods such as pings and probes to gather additional information; however, there are many circumstances where the LM may require feed-back from a (human) expert.

A problem therefore is to find a way to help the LM when using supervised or, in some cases, reinforcement learning and aid the LM in inferring the state values being presented to it by the running system. In the techniques herein, a mechanism is presented whereby an LM will create an on-the-fly tunnel/connection to a human entity for supervision when it encounters states that it has difficulty in categorizing. The basic mechanism in order to setup such a communication channel with a human expert has been described above. That being said, the techniques detailed above describe a mechanism where a unicast channel is instantiated with an expert without the ability to track the current availability or actual degree of expertise of the expert. What would be beneficial is the ability to automatically identify a list of experts, have a dynamic ranking system of experts and the ability to send request to more than one expert at a time.

In the techniques herein, a multicast based point-to-multipoint mechanism is specified. Here the LM advertises a multicast address and allows experts to join it and at the same time share their expertise, availability etc. Using this mechanism, the LM can appropriately select which experts it should contact for a specific class of issue and also form communities of specialized experts always ready for specific areas or severities of issues.

Said differently, the techniques herein present a communication infrastructure for a Learning Machine computation entity to interact with multiple experts for supervised learning. The discovery module allows multiple experts to register with the same LM entity by joining a multicast group. It also allows multiple experts to announce their areas of expertise and preference of issue to the LM. The LM then creates a ranking mechanism using the response to issues it receives from the experts and starts to create 'communities' where experts of a certain ranking are made members of a new multicast tree representing specific expertise. A notification component is responsible for using the communication infrastructure to notify either all experts or selective experts about the state of the network or details about issues and how they are being resolved. Lastly, a de-registration component allows experts to leave the system in a state-full and graceful manner.

Illustratively, the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

Figure 6A:
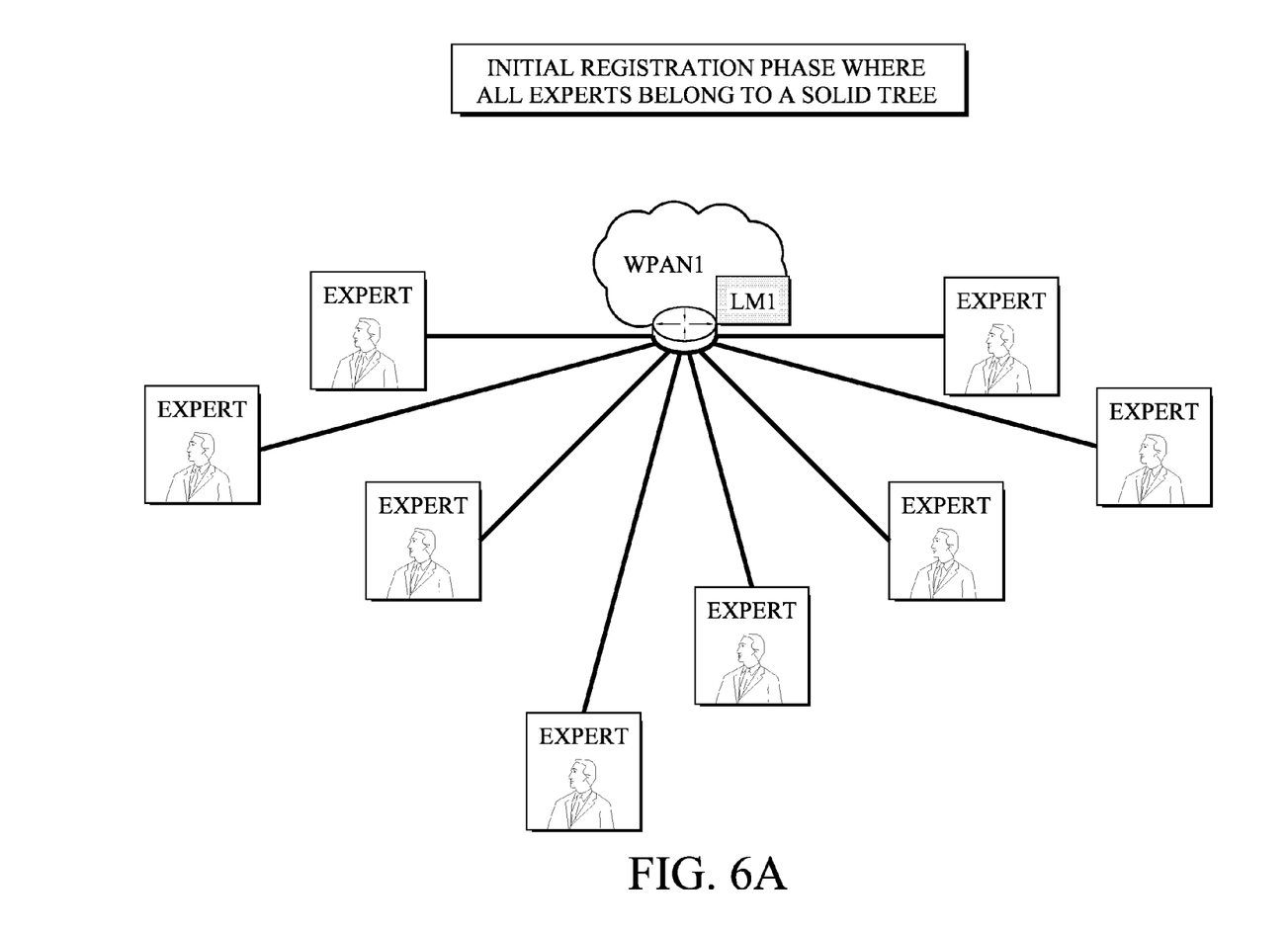
FIGS. 6A-6C illustrate an example of a point-to-point communication infrastructure.
Figure 6B:
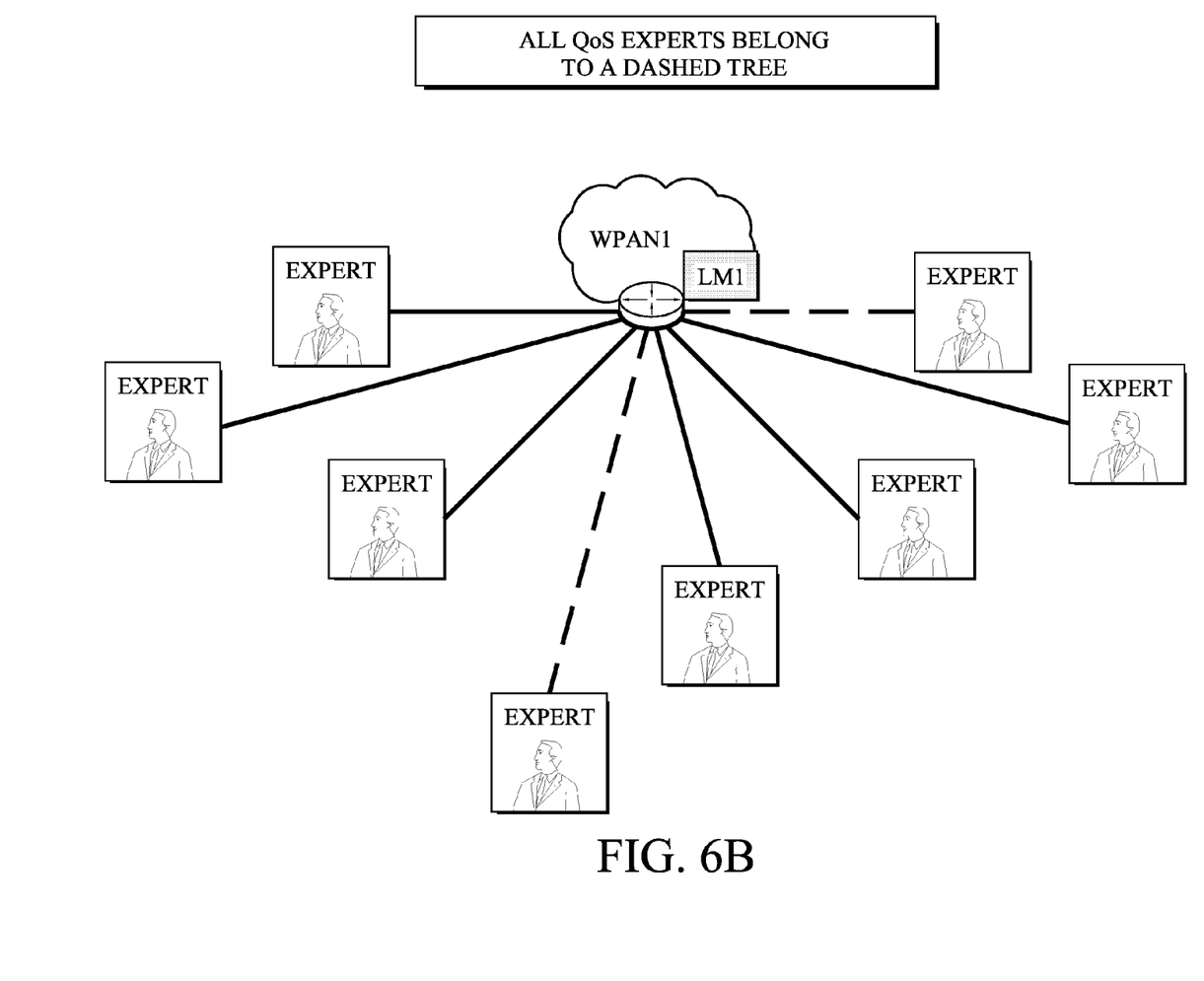
Figure 6C:
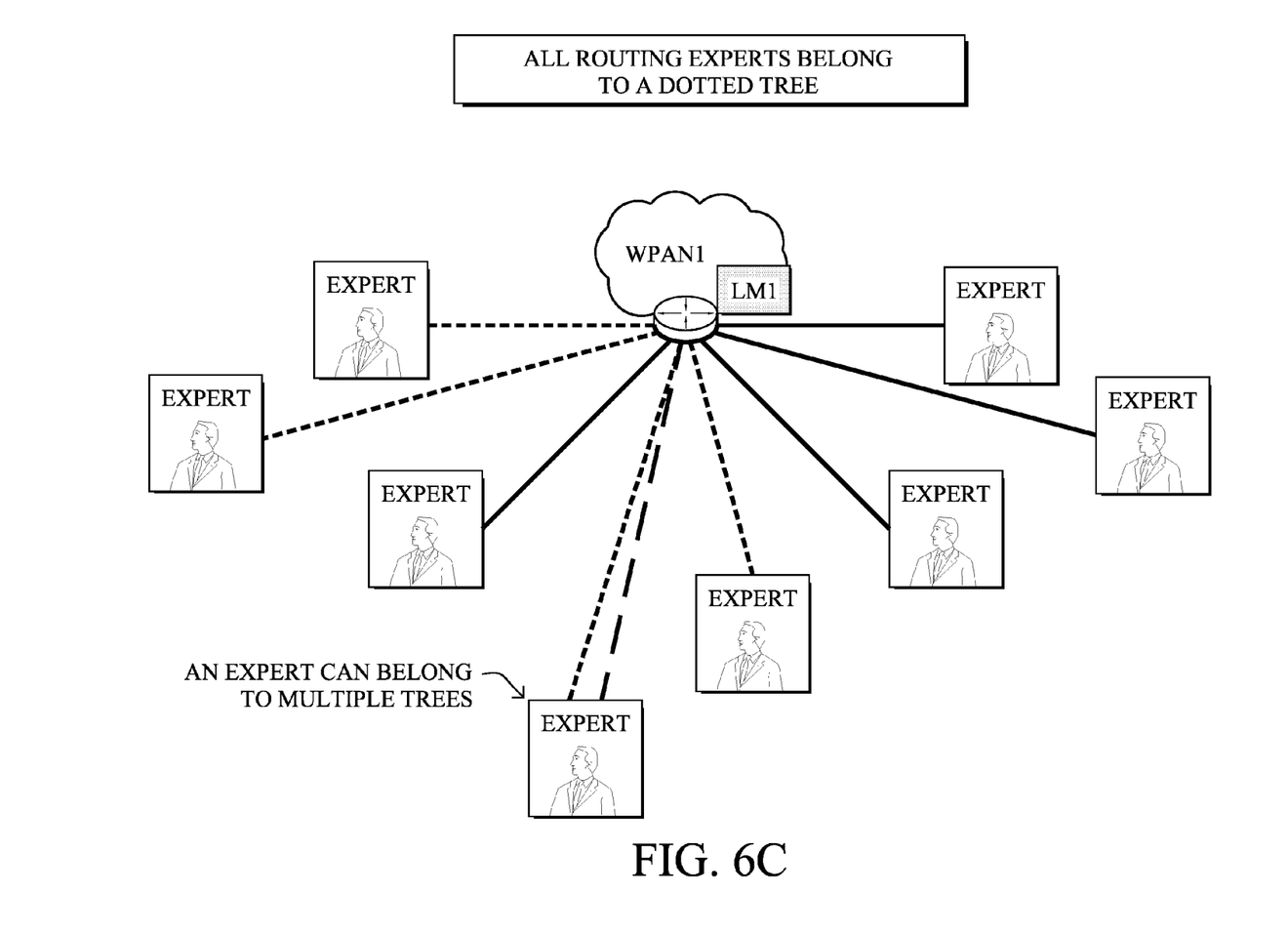

Operationally, as shown in (and with general reference to) FIGS. 6A-6C, the techniques herein consists of several components.

Expert Discovery Component: In the beginning, the LM has no expert that it can refer to and it needs to know about the experts along with their areas of expertise and preference. To that end, a dynamic multicast tree using a well-known address is used to discover experts. Experts can learn about the related multicast group by querying the NMS, using local discovery or upon a simple registration mechanism. This discovery multicast tree is termed the GREY tree used for discovery of expert by LM (shown as a SOLID tree in FIG. 6A). The GREY multicast tree can be setup using PIM-SSM (Protocol Independent Multicast-Source Specific Multicast), a generic multicast tree setup technology that is rooted at a single source (the LM in this case), or other technologies such as P2MP TE LSP.

Based on the customer requirements, experts join this multicast tree and register with the LM, providing their areas of expertise and other preferences such as severity of issues, timing availability, etc. To that end, the techniques herein specify a newly defined IPv6 message carrying a set of TLVs for expert to explicitly notify of their area of expertise, preferences, etc. During this discovery process, the LM maintains the same multicast tree (e.g., the GREY tree) for all the new experts. Once the new experts have joined in the discovery phase, the LM starts to communicate with the experts using either unicast messaging as specified in the techniques above, or alternatively, the LM may send the same request to a set of experts, accordingly to the criticality of the request, among other criteria.

Expert Categorization Component: As the network operations start to proceed and the LM is encountering situations that require expert intervention, the LM goes through the list of experts and their attributes such as severity of the issue, area of expertise, and it starts to reach out to those experts using novel IPv6 query messages. Once an expert responds using a newly defined IPv6 response message, the LM starts to send out more details about the issue for which feedback is required. Note that in another embodiment, multiple experts can respond to the same LM request and in this case, the LM can decide to get multiple opinions (and therefore employ a decision mechanism such as majority voting) or employ an arbitration mechanism to seek the help of only one expert. In another embodiment, the LM might need to ask the question to all the experts and then fuse the response to make a decision.

Once experts start to respond to LM requests, the LM starts evaluating these experts according to multiple attributes such as the quality of the feedback, the responsiveness, the cost (e.g., how far from the LM the expert is), etc. The quality of the feedback may be computed by evaluating its consistency with the feedback of other experts, or by evaluating the gain in performance after incorporating into the LM. Based on these attributes, an overall score of the expert i on task j, which we write $S_i(j)$. Now, the process of selecting an expert that is fit for a task j is very similar to the process used in online retail stores to recommend items to users. In our case, recommended items are the experts, which need to be picked by the LM, and the users are the various classes of problem.

Recommendation is performed using a so-called preference matrix P that contains the score of each expert on each class of problem. Each class of problem to be recommended makes up a column of P whereas each expert makes up a row of P. Using an algorithm called Principal Component Analysis (PCA), one may discover the main trends in the dataset. As an illustration, PCA will construct a new space that would be made up of these dimensions: expertise in QoS, expertise in routing, quick answers, slow but sometimes inaccurate answers, average expertise in all topics, etc. Note that PCA does not actually label these dimensions, but it re-expresses both experts and tasks in this space based on the statistical properties of the dataset. By combining these trends for both experts and tasks, the LM can infer the adequacy of an expert for a given task even though the said expert has never perform the said task. Also, by creating clusters of experts in the space of trends, it can categorize experts according to their adequacy to a given type of tasks.

Based on this categorization, the LM also starts to create new multicast trees that are for experts in a certain area of expertise or have certain preferences for severity etc. In one embodiment, as shown in FIG. 6B, the LM might create a new 'RED' tree (DASHED in FIG. 6B) and make only the experts who want to address high severity issues in QoS a member. At this point, a GREY multicast tree (FIG. 6A) is used for general discovery of experts, and specialized colored trees (e.g., RED/DASHED in FIG. 6B and GREEN/DOTTED in FIG. 6C) are used in order to categorize expert according to their area of expertise, or any more sophisticated form of classification (per expertise, quality of feed-back, time of availability, etc).

Note that it is possible that one expert can be a member of multiple trees based on his expertise in multiple areas (as shown in FIG. 6C). This mechanism can either be configurable or be completely autonomous as per the LM. In multiple embodiments, the network operator can control how many such specialized multicast trees should be created based on communication overhead and cost factors. The LM can use multiple mechanisms to maintain these specialized trees. In one embodiment, if some experts become dormant after not responding to several requests, they may be removed from the tree and moved back to the 'grey' tree. Such a mechanisms can be employed by the LM to intrinsically rate experts and contact them accordingly. When the LM requires assistance from an expert, it may either send a unicast request to that expert or send the same request to a set of experts, should the request be highly critical, additional feed-back required to rank experts, etc. In another embodiment, metrics such as cost incurred, delay, distance etc. can also be used to categorize experts. This can be done using pre-configured policies at the LM.

Notification Component: As one primary goal of the point-to-multipoint (P2MP) infrastructure is to setup a scalable communication channel with multiple experts and provide dynamic ranking of experts, the notification component uses it to send updates from the LM to the experts and vice-versa.

Even though not all experts will be contacted after a certain operational time has elapsed, they will still be notified of all the significant network events that have been taking place. In another embodiment, experts will also be notified of which experts are currently involved in an issue and what their decision points have been. This component will thus allow all the experts to be in the loop and also serve as an archival tool for future troubleshooting.

De-registration component: With time, certain experts may no longer be available due to many reasons, which must be kept track of by the LM. In one embodiment, an expert leaving the system can explicitly de-register with the LM so that no notifications or supervision requests are sent to him. When this happens, the LM also keeps track of all the decisions that expert took and can share with a centralized entity for future cases. In another embodiment, an expert might simply become unavailable without any explicit notification. In this case, the LM could first move this expert to the 'grey' tree and after some elapsed time finally move him to a 'black' list, which keeps track of all permanently unavailable experts.

The techniques described herein, therefore, provide for a point-to-multipoint communication infrastructure for expert-based knowledge feed-back using learning machines. In particular, the point-to-multi-point communication infrastructure provides a scalable mechanism for an LM to communicate with multiple experts at the same time. Also, the categorization of experts to form specialized communities of experts allows a network operator to always track the best specialists, while a stateful and graceful de-registration mechanism makes sure that the LM is not trying to contact an expert that is not present and thus not wasting processing or network resources. Further, the notification component provides a scalable communication mechanism by which important network events can be shared with the expert community.

Figure 7:
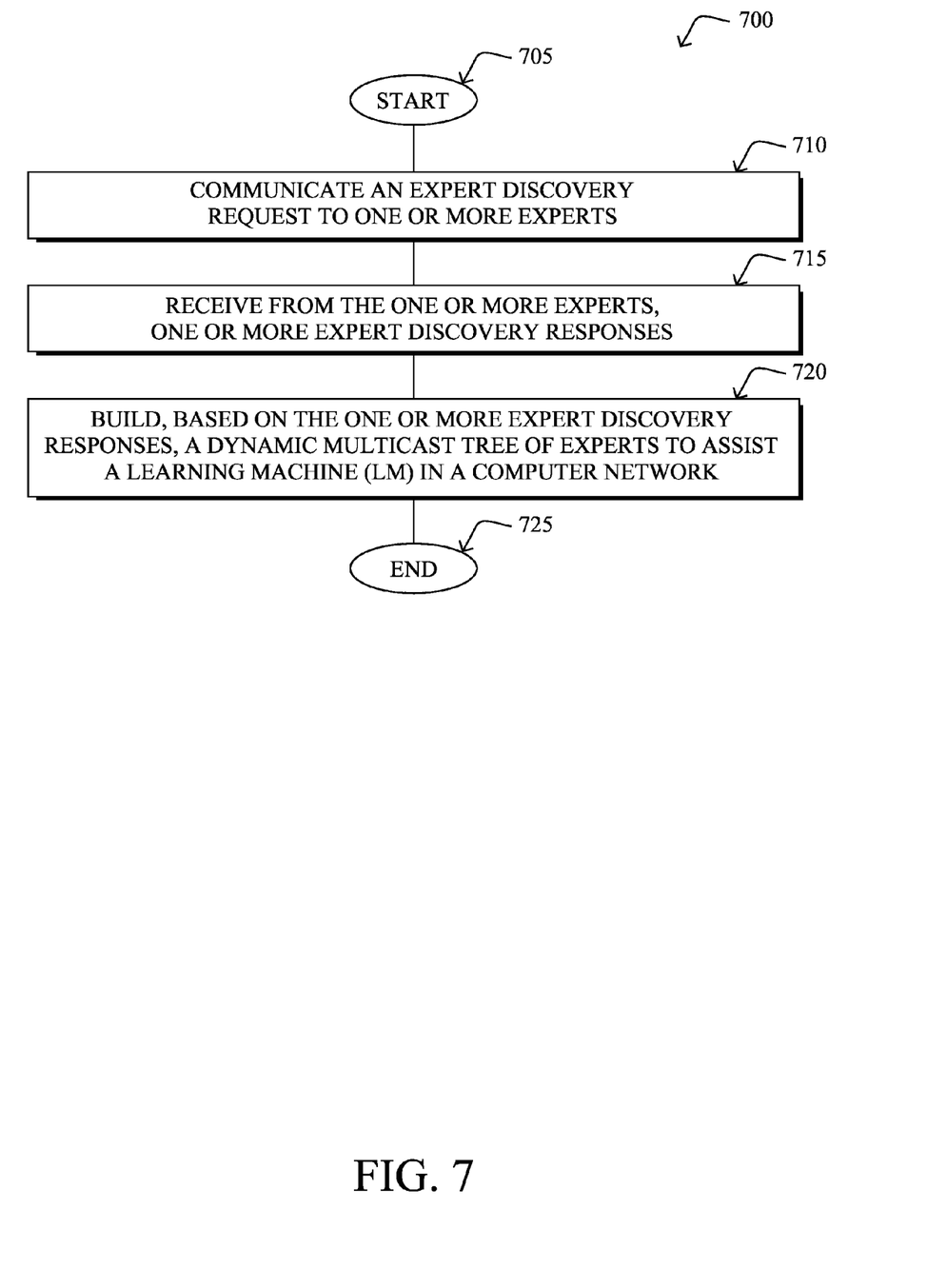
FIG. 7 illustrates an example simplified procedure for a point-to-multipoint communication infrastructure to provide a learning machine with expert-based knowledge feed-back.

Similarly, FIG. 7 illustrates an example simplified procedure 700 for a point-to-multipoint communication infrastructure for expert-based knowledge feed-back using learning machines. The procedure 700 may start at step 705, and continue to step 710 where, as described above, a learning machine may communicate an expert discovery request into a network to discover one or more experts. As shown in step 715, the learning machine may then receive from the one or more experts, one or more expert discovery responses. Step 720 shows that based on the one or more expert discovery responses, the learning machine may build a dynamic multicast tree of experts to assist the learning machine in a computer network. Illustratively, the simplified procedure may end at step 720.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedure 700 is described separately, certain steps from each procedure may be incorporated into each other procedure, and the procedures are not meant to be mutually exclusive.

While there have been shown and described illustrative embodiments that provide for a point-to-multipoint communication infrastructure for expert-based knowledge feed-back using learning machines, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
communicating, by a node in a network executing a learning machine (LM), an expert discovery request into the network to discover one or more experts;
receiving, from the one or more experts, one or more expert discovery responses;
building, based on the one or more expert discovery responses, a dynamic multicast tree of experts to create a communication infrastructure for the LM to interact with multiple experts for supervised learning;
determining, by the node, that the LM does not have a way of categorizing a certain set of data received at the node;
in response to determining that the LM cannot categorize the certain set of data, triggering, by the node, an on-the-fly tunnel connection to at least one of the one or more experts in the multicast tree of experts;
sending, by the node, an expert request message over the on-the-fly tunnel connection, the expert request message requesting input by the at least one expert to categorize the certain set of data for the LM;
receiving, at the node, one or more expert input responses; and
categorizing, by the LM on the node, the certain set of data based on the one or more expert input responses.

2. The method according to claim 1, further comprising:
including in the expert request message an indication of a particular expert from which the LM is requesting information.

3. The method according to claim 1, further comprising:
categorizing, based on the one or more expert discovery responses, the experts into one or more areas of expertise; and
dividing, based on the one or more areas of expertise, the dynamic multicast tree of experts into one or more dynamic multicast sub-trees of experts, wherein an expert can be associated with more than one dynamic multicast sub-tree of experts simultaneously.

4. The method according to claim 1, wherein the one or more expert discovery responses include data on one or more expert parameters selected from the group consisting of: area of expertise, availability, inquiry response time, response accuracy, and severity of issues.

5. The method according to claim 1, further comprising:
evaluating, based on the received one or more expert discovery responses, the one or more experts.

6. The method according to claim 5, wherein the evaluating is based on one or more parameters, wherein the one or more parameters include a quality of feedback, a response time for providing feedback, an accuracy of feedback, an expertise associate with a particular topic, an average expertise across many topics, a cost associated with feedback, a subsequent improvement in network performance, or a review from another expert.

7. The method according to claim 5, further comprising:
recommending, based on the evaluating, a particular expert for a particular LM inquiry.

8. The method according to claim 1, further comprising:
dynamically monitoring a status of the one or more experts; and
de-registering any of the one or more experts that are no longer available to assist the LM, wherein the de-registering is initiated by the LM or the one or more experts.

9. The method according to claim 1, further comprising:
maintaining a dedicated communication channel for the one or more experts to register and join.

10. An apparatus, comprising:
one or more network interfaces that communicate with a network;
a processor coupled to the one or more network interfaces and configured to execute a process; and
a memory configured to store program instructions which contain the process executable by the processor, the process comprising:
communicating an expert discovery request into a network to discover one or more experts;
receiving, from the one or more experts, one or more expert discovery responses;
building, based on the one or more expert discovery responses, a dynamic multicast tree of experts to create a communication infrastructure for the LM to interact with multiple experts for supervised learning;
determining that the LM does not have a way of categorizing a certain set of data received at the node;
in response to determining that the LM cannot categorize the certain set of data, triggering an on-the-fly tunnel connection to at least one of the one or more experts in the multicast tree of experts;
sending an expert request message over the on-the-fly tunnel connection, the expert request message requesting input by the at least one expert to categorize the certain set of data for the LM;
receiving one or more expert input responses; and
categorizing, by the LM, the certain set of data based on the one or more expert input responses.

11. The apparatus according to claim 10, wherein the process further comprises:
including in the expert request message an indication of a particular expert from which the LM is requesting information.

12. The apparatus according to claim 10, wherein the process further comprises:
categorizing, based on the one or more expert discovery responses, the experts into one or more areas of expertise; and
dividing, based on the one or more areas of expertise, the dynamic multicast tree of experts into one or more dynamic multicast sub-trees of experts, wherein an expert can be associated with more than one dynamic multicast sub-tree of experts simultaneously.

13. The apparatus according to claim 10, wherein the one or more expert discovery responses include data on one or more expert parameters selected from the group consisting of: area of expertise, availability, inquiry response time, response accuracy, and severity of issues.

14. The apparatus according to claim 10, wherein the process further comprises:
evaluating, based on the received one or more expert discovery responses, the one or more experts.

15. The apparatus according to claim 10, wherein the evaluating is based on one or more parameters, wherein the one or more parameters include a quality of feedback, a response time for providing feedback, an accuracy of feedback, an expertise associate with a particular topic, an average expertise across many topics, a cost associated with feedback, a subsequent improvement in network performance, or a review from another expert.

16. The apparatus according to claim 10, wherein the process further comprises:
   recommending, based on the evaluating, a particular expert for a particular LM inquiry.

17. The apparatus according to claim 10, wherein the process further comprises:
   dynamically monitoring a status of the one or more experts; and
   de-registering any of the one or more experts that are no longer available to assist the LM, wherein the de-registering is initiated by the LM or the one or more experts.

18. A tangible non-transitory computer readable medium storing program instructions that cause a computer to execute a process, the process comprising:
   communicating, from a node executing a learning machine (LM), an expert discovery request to one or more experts;
   receiving, from the one or more experts, one or more expert discovery responses;
   building, based on the one or more expert discovery responses, a dynamic multicast tree of experts to create a communication infrastructure for the LM to interact with multiple experts for supervised learning;
   determining, as the node, that the LM does not have a way of categorizing a certain set of data received at the node;
   in response to determining that the LM cannot categorize the certain set of data, triggering, at the node, an on-the-fly tunnel connection to at least one of the one or more experts in the multicast tree of experts;
   sending, from the node, an expert request message over the on-the-fly tunnel connection, the expert request message requesting input by the at least one expert to categorize the certain set of data for the LM;
   receiving, at the node, one or more expert input responses; and
   categorizing, as the LM on the node, the certain set of data based on the one or more expert input responses.

* * * * *